(12) United States Patent
Marchese

(10) Patent No.: US 10,730,445 B2
(45) Date of Patent: Aug. 4, 2020

(54) SPORTS BAR ASSEMBLY FOR A TRUCK

(71) Applicant: Ford Global Technologies LLC, Dearborn, MI (US)

(72) Inventor: Alex Marchese, Melbourne (AU)

(73) Assignee: Ford Global Technologies LLC, Dearborn, MI (US)

( * ) Notice: Subject to any disclaimer, the term of this patent is extended or adjusted under 35 U.S.C. 154(b) by 0 days.

(21) Appl. No.: 16/253,646

(22) Filed: Jan. 22, 2019

(65) Prior Publication Data
US 2019/0263325 A1   Aug. 29, 2019

(30) Foreign Application Priority Data
Feb. 23, 2018  (CN) .......................... 2018 1 0154601

(51) Int. Cl.
| | | |
|---|---|---|
| *B60R 9/06* | (2006.01) | |
| *B60P 3/40* | (2006.01) | |
| *B60R 9/045* | (2006.01) | |
| *B60R 5/04* | (2006.01) | |

(52) U.S. Cl.
CPC .................................. *B60R 9/06* (2013.01); *B60P 3/40* (2013.01); *B60R 5/041* (2013.01); *B60R 9/045* (2013.01)

(58) Field of Classification Search
CPC ....................................................... B60P 3/40
USPC ....................... 224/402–405; 296/3
See application file for complete search history.

(56) References Cited

U.S. PATENT DOCUMENTS

| | | | | |
|---|---|---|---|---|
| 4,398,763 A | * | 8/1983 | Louw | B62D 33/02 224/309 |
| 5,316,190 A | * | 5/1994 | Bullock | B60P 3/42 211/182 |
| 5,752,636 A | * | 5/1998 | Manley | B60P 3/40 224/403 |
| 6,799,706 B2 | | 10/2004 | Essig | |
| 8,864,001 B2 | | 10/2014 | Langseder | |
| 9,616,837 B1 | | 4/2017 | Bartel et al. | |
| 2002/0036412 A1 | * | 3/2002 | Bareket | B60P 3/40 296/3 |
| 2008/0099522 A1 | * | 5/2008 | Clausen | B60R 9/06 224/519 |

FOREIGN PATENT DOCUMENTS

| | | |
|---|---|---|
| JP | H081113100 A | 5/1996 |
| MX | 2009011110 A | 5/2011 |

OTHER PUBLICATIONS

MR Roll Bar for Ford Ranger 2012-2017 PX1/PX2 https://autoprestige.co.nz/collections/ranger-px2-2015-2016/products/mr-roll-bar-for-ford-ranger-2015.

* cited by examiner

*Primary Examiner* — Scott T McNurlen
(74) *Attorney, Agent, or Firm* — David Coppiellie; Kolitch Romano LLP

(57) ABSTRACT

A sports bar in a truck is provided. The sports bar may comprise a base including a first member and a second member coupled to the first member via a pivot bracket, and a hoop pivotally connected to the pivot bracket to be rotatable between an open position and a closed position. A top of the hoop is adjacent to a cabin of the truck at the closed position and the top of the hoop is at a rear of a truck bed at the open position.

16 Claims, 7 Drawing Sheets

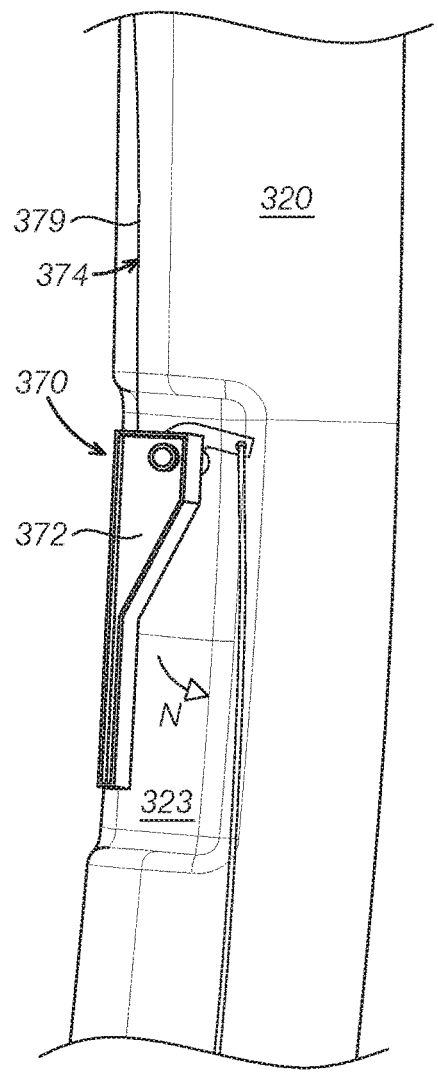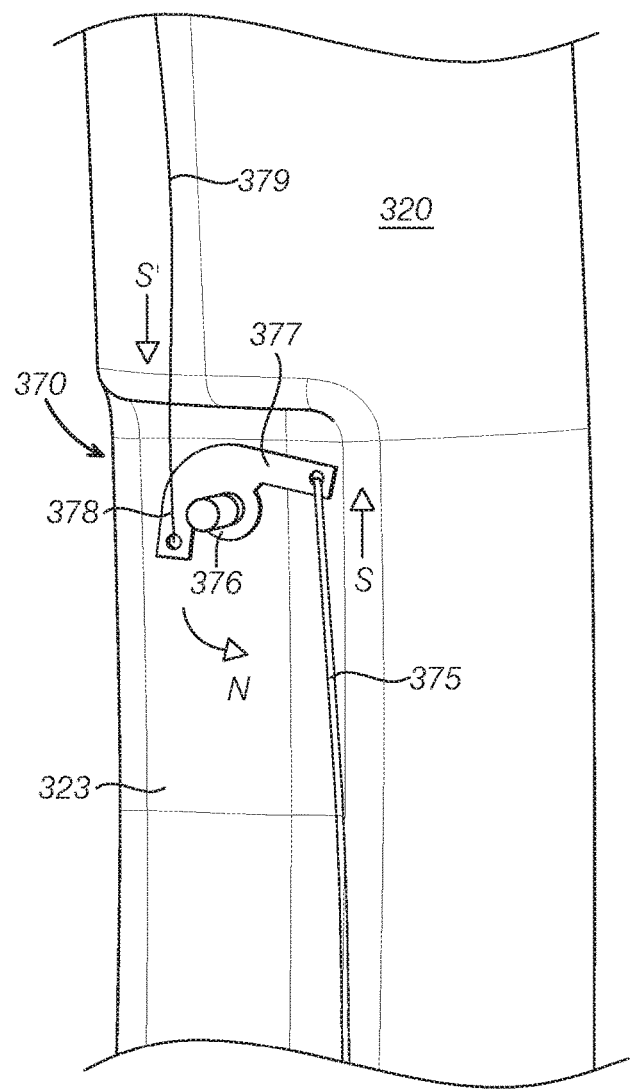
FIG. 5A                    FIG. 5B

SPORTS BAR ASSEMBLY FOR A TRUCK

RELATED APPLICATION

This application claims the benefit of Chinese Patent Application No.: CN 201810154601.6 filed on Feb. 23, 2018, the entire contents thereof being incorporated herein by reference.

FIELD

The present disclosure relates to a sports bar assembly in a truck, in particular, a sports bar assembly having variable configurations.

BACKGROUND

Some trucks such as pickup trucks are equipped with roll bars or sports bars, which has become an important stylish feature for the pickup trucks. As the sports bars provide limited usages, there have been aftermarket designs to add load carrying capacities to the sports bars. Further, some pickup trucks comprise a rack arrangement specifically designed to support load. For instance, U.S. Pat. No. 8,864,001 discloses a variable load support system for enhancing the load carrying capabilities and adaptability for pickup trucks with different bed sizes. However, the load support system does not provide sporty feature for the trucks.

The inventor of the present disclosure has recognized there is a need to provide a sports bar assembly with better appearance as well as improved functionality.

SUMMARY

According to one aspect of the present disclosure, a sports bar assembly for a truck is provided. The sports bar assembly may comprise a base including a first member and a second member coupled to the first member via a pivot bracket, and a hoop pivotally connected to the pivot bracket to be rotatable between an open position and a closed position. The top of the hoop is adjacent to a cabin of the truck at the closed position and the top of the hoop is at a rear of a truck bed at the open position.

In one embodiment, the sports bar assembly may further comprise a lock device to lock the hoop to the base at the open position and at the closed position, and a release device disposed on the hoop to unlock the hoop such that the hoop is pivotable between the open position and the closed position.

In another embodiment, the pivot bracket may include a body connected to one of the first member and the second member, a main brace connected to the first member and the second member respectively, and a side brace connected to the hoop and pivotal relative to the body.

In another embodiment, the main brace and the side brace may be connected to the body via a pivot.

In another embodiment, the main brace may include a first plate and a second plate opposing the first plate. The first and second plates sandwich one end of the first member and one end of the second member. The side brace may include a third plate and a fourth plate opposing the third plate, and the third and fourth plates sandwich an end of the hoop and coupling the hoop to the body of the pivot bracket.

In another embodiment, the body of the pivot bracket may include a first aperture having a first angle to a truck bed and facing a front of the truck, and a second aperture having a second angle to the truck bed and facing the rear of the truck.

An end of the hoop may further include a pin. The hoop is locked at the closed position when the pin is received in the first aperture and the hoop is locked at the open position when the pin is received in the second aperture in the body of the pivot bracket.

In another embodiment, the hoop may further comprise a release device. The release device may include a release handle and a cable extending in the hoop to connect the pin with the release handle, and a force on the release handle enables the pin to be released from the first and second apertures.

In another embodiment, the body of the pivot bracket may include a curved surface between the first aperture and the second aperture to facilitate a movement of the hoop, two top protrusions and two lower protrusions. The two top protrusions may form a first stop surface having a third angle to a truck bed and the two lower protrusions may form a second stop surface having a fourth angle to the truck bed. At least one of the hoop and the side brace may be partially rested on the first and second stop surfaces at the open position and the closed position, respectively.

In another embodiment, the body of the pivot bracket may include two top bumpers on the first stop surface and two lower bumpers on the second stop surfaces to restrict further (e.g. lateral) movement of the hoop or the side brace, at the closed position and the open position.

In another embodiment, the hoop may be at least partially hollow and may include a pin housing at the end, and the pin may be extendable through a hole of the pin housing by the force on the release handle.

In another embodiment, the pin may have a truncated cone shaped tip portion to facilitate movement of the pin in and out the first aperture and the second aperture.

In another embodiment, the hoop may have a U-shape and may comprise a first end and a second end. The base may comprise a first base and a second base, wherein the pivot bracket may include a first pivot bracket and a second pivot bracket. The first and second ends of the hoop may be connected to the first and second base, respectively via the first and second pivot bracket.

According to another aspect of the present disclosure, a sports bar assembly for a truck having a cabin and a bed is provided. The sports bar assembly may comprise a first base connected to the truck bed, a second base connected to the truck bed and spaced apart from the first base at a transverse direction, a first hoop connected to the first base and the second base, and a second hoop. The first hoop may be adjacent to the cabin, and the second hoop may have a U-shape. A first end of the second hoop may be pivotably connected to the first base via a first pivot bracket, and a second end of the second hoop may be pivotably connected to the second base via a second pivot bracket such that the second hoop is rotatable between an open position and a closed position. The second hoop may be away from the first hoop at the open position; and the hoop may be close to the first hoop at the closed position.

In another embodiment, the first pivot bracket may include a first body and a first side brace, and the second pivot bracket may include a second body and a second side brace. The first and second ends of the second hoop may be connected to the first and second side braces, respectively and rotatable to the first and second pivot brackets, respectively.

In another embodiment, the first base may include a first member and a second member and the second base may include a third member and a fourth member. The first pivot bracket may include a first main brace, and the second pivot bracket may include a second main brace. The first and second members of the first base may be connected by the first main brace and the third and fourth members may be connected by the second main brace.

In another embodiment, the sports bar assembly may further comprise a lock device to lock the second hoop at the open position and the closed position, and a release device on the second hoop to unlock the second hoop from the open position and the closed position.

In another embodiment, the first end of the second hoop may include a first pin and the second end of the second hoop may include a second pin. And the release device may include a release handle and a cable extending along a portion of the hoop and connecting the release handle to the first and second pins. A force on the release handle causes both the first pin to be released from a first aperture or the second aperture in the first body and the second pin to be released from a third aperture or a fourth aperture in the second body, respectively.

In another embodiment, the release handle may be located at an outside surface of the second hoop and face an inner portion of the truck bed.

In another embodiment, the release device may further include an actuator. The actuator may be disposed between the release handle and the hoop, and may have a first arm and a second arm opposite to the first arm. The first arm may be connected to the first pin via a first cable segment and the second arm may be connected to the second pin via a second cable segment, and a force on the release handle enables the first and second arms pivot simultaneously and pulls the first pin out from a first aperture or a second aperture in the first body of the first pivot bracket and the second pin out from a third aperture or a fourth aperture in the second body of the second pivot bracket.

According to another aspect of the present disclosure. A sports bar assembly in a truck is provided. The sports bar assembly may comprise a first base extending at a longitudinal direction and connected to a truck bed and a second base extending at the longitudinal direction and connected to the truck bed and a hoop. The second base may be spaced away from the first base at a transverse direction and the hoop may include a cross beam, a first pillar and a second pillar. The first pillar may be pivotable relative to the first base bar via a first pivot bracket and the second pillar may be pivotable relative to the second base bar via a second pivot bracket between an open position and a closed position. The cross beam of the hoop may be adjacent to a top of a cabin of the truck at the closed position and may be away from the top of the cabin at the open position.

In another embodiment, the first base may include a first horizontal member and a first base member coupled to the first horizontal member by the first pivot bracket. The second base may include a second horizontal member and a second base member coupled to the first horizontal member by the second pivot bracket. The first pivot bracket and the second pivot bracket may be positioned closer to a rear of the truck bed than to the cabin.

One or more advantageous features as described herein elsewhere will be readily apparent from the following detailed description of embodiments when taken in connection with the accompanying drawings.

BRIEF DESCRIPTION OF THE DRAWINGS

For complete understanding of one or more embodiments of this invention, reference should be made to the embodiments illustrated in greater detail in the accompanying drawings and described below by way of examples.

FIG. 5A and FIG. 5B illustratively depict a release device of a sports bar assembly according to one embodiment of the present disclosure.

DETAILED DESCRIPTION

Figure 1A:
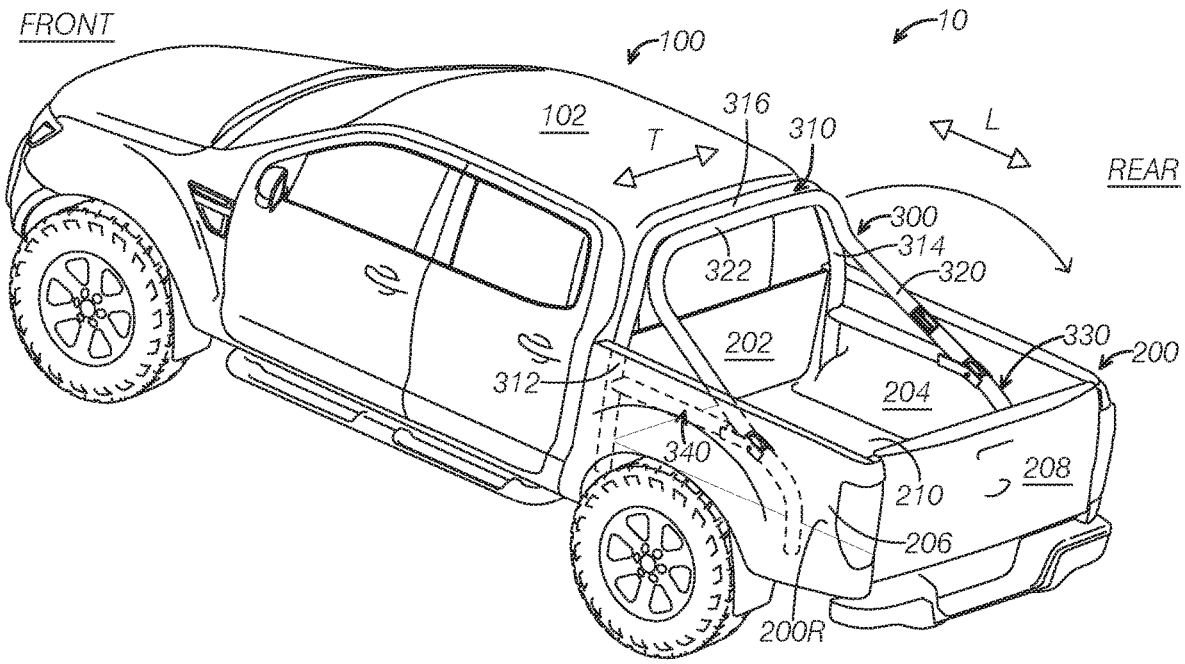
FIG. 1A and FIG. 1B show an example sports bar assembly installed in a truck according to one embodiment of the present disclosure, illustrating a second hoop at a closed position and an open position, respectively.

As referenced in the figures, the same or similar reference numerals are used to refer to the same or similar components. In the following description, various operating parameters and components are described for different constructed embodiments. These specific parameters and components are included as examples and are not meant to be limiting. Therefore, specific structural and functional details disclosed herein are not to be interpreted as limiting, but merely as a representative basis for teaching one skilled in the art to implement the present invention in various manners.

As required, detailed embodiments of the present invention are disclosed herein; however, it should be understood that the disclosed embodiments are merely examples of the invention that may be implemented in various and alternative forms. The figures are not necessarily drawn in scale; some features may be exaggerated or minimized to show details of particular components.

The present disclosure provides a sports bar assembly with a stylish element as well as functionality such as holding items. For example, the sports bar assembly can be converted to a configuration to hold an item which would not normally fit in the back of the truck bed.

Figure 1B:
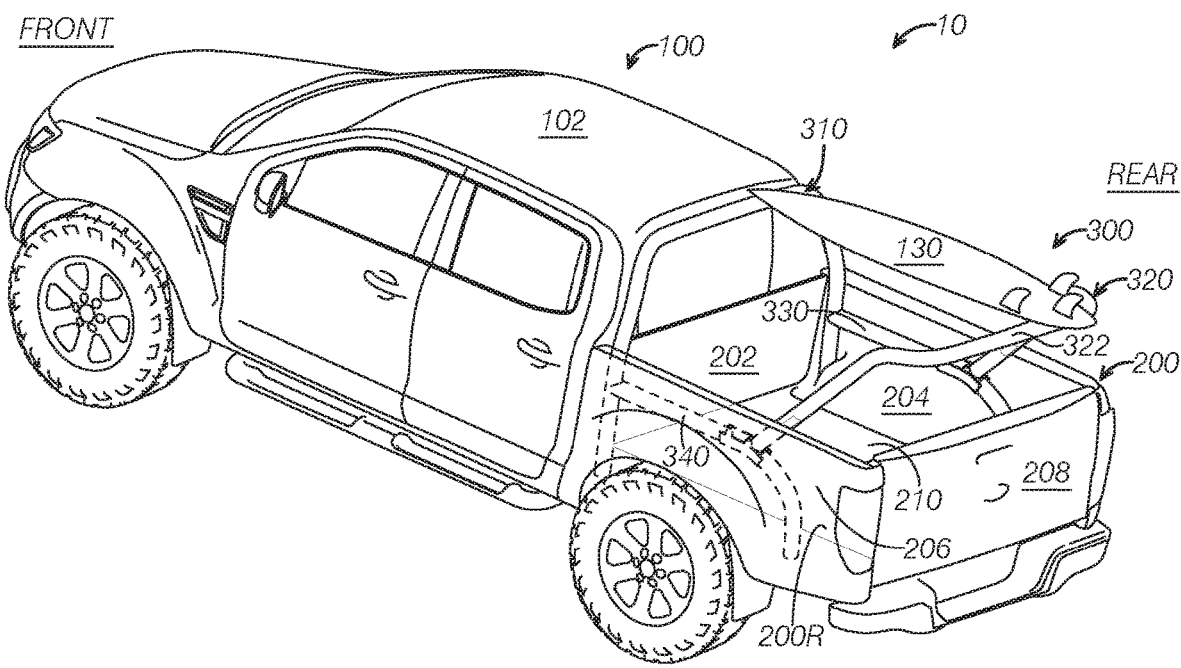

FIG. 1A and FIG. 1B generally depict a truck and a sports bar assembly installed in the truck according to one embodiment of the present disclosure, illustrating a hoop of the sports bar assembly at an open and a closed position, respectively. As shown in FIG. 1A and FIG. 1B, a vehicle or more specifically a truck 10 includes a cabin 100 located at a front portion of the vehicle 10 for a driver and passengers and a bed 200 located at a rear portion of the vehicle 10 for carrying load. In FIG. 1A and FIG. 1B. The cabin 100 includes a top 102. The truck bed 200 is configured to have a first wall 202 adjacent to the cabin 100, two opposing sidewalls 204, 206, a tail gate 208 located at a rear of the truck 10 and a bottom panel 210. A sports bar assembly 300 is installed on the bed 200 to provide a stylish element as well as functionality. The sports bar assembly 300 includes a first hoop 310 adjacent to the cabin 100 and connected to the bed 200, and a second hoop 320 pivotable as the arrow indicated between the closed position shown in FIG. 1A and the open position shown in FIG. 1B. At the closed position, the second hoop 320 is close to the first hoop 310. That is, at the closed position, the second hoop 320 is adjacent to the cabin 100, or at least a top portion 322 of the second hoop 320 is adjacent to the cabin 100 or a top 316 of the first hoop 310. At the open position shown in FIG. 1B, the second hoop 320 is spaced further away from the first hoop 310 and is close to a rear end of the bed 200. For instance, the second hoop 320 or the top 322 of the second hoop 320 may be adjacent to the tail gate 208 at the open position.

Continuing with FIG. 1A and FIG. 1B, the sports bar assembly 300 includes a first base 330 and a second base 340 connected to the bed 200, respectively. Both ends of the second hoop 320 are pivotably connected to the first base 330 and the second base 340. As shown in the figures, the first base 330 and the second base 340 may be elongated bars or tubes which extend along a longitudinal direction L and are spaced apart at a transverse direction T. In the depicted embodiment, the first base 330 and the second base 340 have an L-shape and are connected to a first side 312 and a second side 314 of the first hoop 310, respectively. It will be appreciated that the first base 330 and the second base 340 may have any appropriate configurations, independent to the first hoop 310 and directly connected to a suitable part of the bed 200. In another embodiment, the first hoop 310 may be omitted. The movable sports bar assembly 300 can provide good appearance as well as additional functionalities. For instance, at the closed position, the second hoop 320 is retracted or folded to a position close to the cabin 100, adding a customized touch and sporty look. At the open position, the second hoop 320 extended to the rear portion of the vehicle 10 can be used as a support for items. For example, the user may load large items such as a skateboard 130 on the second hoop 320 and the first hoop 310. In one embodiment, at one open position, the top 322 of the second hoop 320 may be positioned over the tailgate 208.

Figure 2:
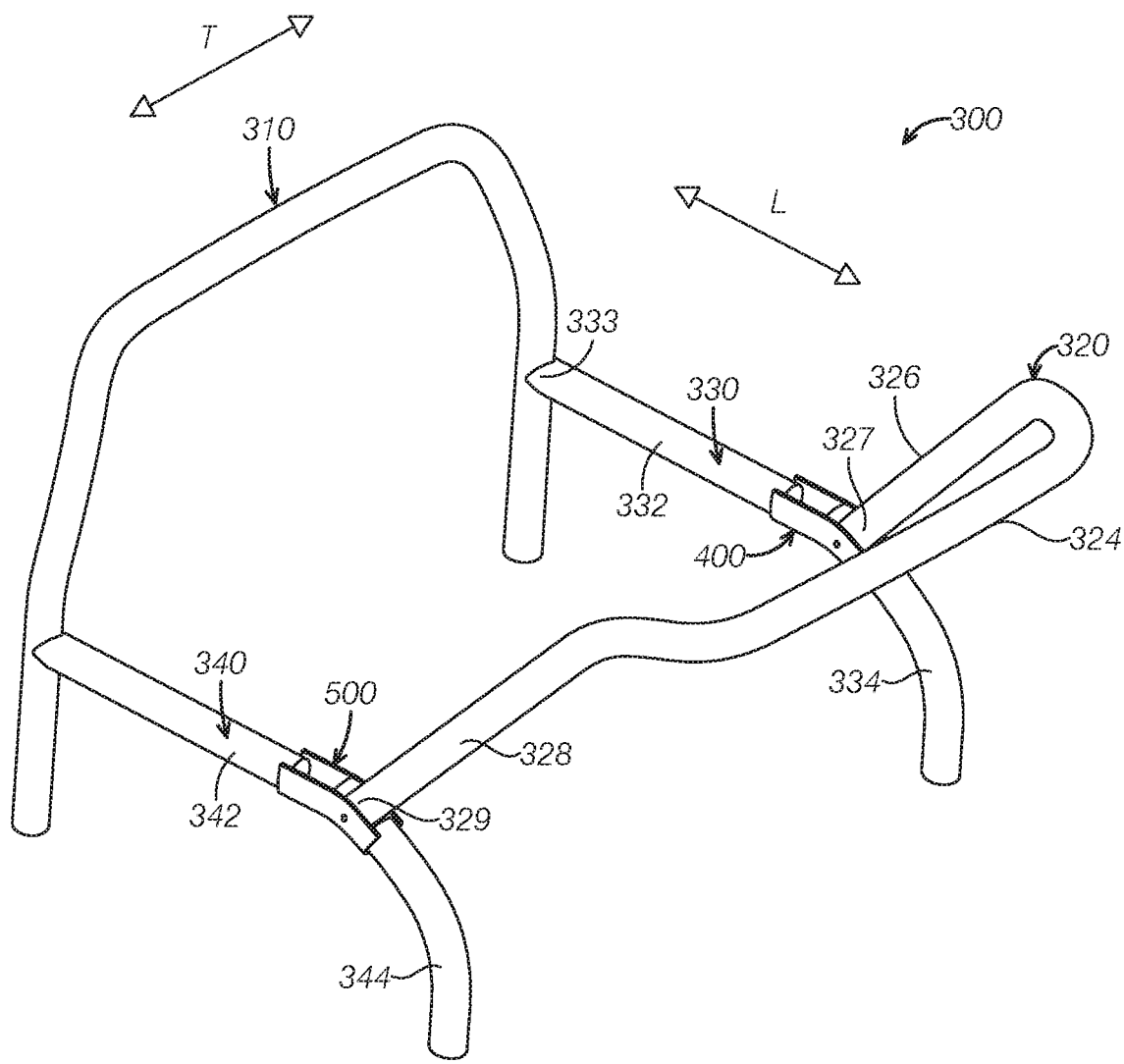
FIG. 2 shows the sports bar assembly in FIG. 1B.

FIG. 2 illustratively depicts the sports bar assembly 300 at the open position. In the depicted embodiment, the second hoop 320 includes a cross beam 324 extending generally along the traverse direction T, a first pillar 326 and a second pillar 328. The first pillar 326 has a first end 327 and the second pillar 328 has a second end 329. The first end 327 of the second hoop 320 is pivotably connected to the first base 330 via a first pivot bracket 400, and the second end 329 of the second hoop 320 is pivotably connected to the second base 340 via a second pivot bracket 500 such that the second hoop 320 is pivotable between an open position and a closed position. Referring to FIG. 1A to FIG. 2, the cross beam 324 of the hoop 320 is adjacent to the top 102 of a cabin 100 of the truck 10 at the closed position and is away from the top 102 of the cabin 100 at the open position. It will be appreciated that the second hoop 320 may adopt any appropriate shapes. For instance, the second hoop 320 may include a first curved segment between the first pillar 326 and the cross beam 324 and a second curved segment between the second pillar 328 and the cross beam 324. The second hoop 320 may be configured such that its top 322 substantially touches a top 316 of the first hoop 310 at the closed position. In another instance, the cross beam 324 may have any appropriate configuration to add a personal touch to the sports bar assembly at the closed position. The second hoop 320 may be an integrally formed piece.

Continuing with FIG. 1A through FIG. 2, the first base 330 includes a first member 332 and a second member 334 connected to the first member 332 via the first pivot bracket 400. In the depicted embodiment, the first member 332 extends along the longitudinal direction L and is implemented as a first horizontal member 332, and has one end 333 connected to the first hoop 310. The second member 334 may be configured as a first base member connecting to the first horizontal member 332 and the bed 200. Similarly, the second base 340 includes a third member 342 and a fourth member 344. The third member 342 extends along the longitudinal direction L and is implemented as a second horizontal member 342, and the fourth member 344 may be used as a second base member connecting with the second horizontal member 342 and the bed 200. The first base member 334 may be connected to the bed 200 with any appropriate approaches such as via a fastener (e.g., bolt/screw) and welding. In the depicted embodiment, the first horizontal member 332 and the second horizontal member 342 are spaced from each other at the traverse direction T and adjacent to side walls 204, 206, respectively. In one example, the first horizontal member 332 and the second horizontal member 342 are parallel to each other and are lower than the tops of the side walls 204, 206 and invisible when viewed outside the vehicle 10. The height of the first base 330 and the second base 340 may vary depending on a size of the truck bed and may be adjustable to support and retain the goods or loads. In some embodiments, the first pivot bracket 400 and the second pivot bracket 500 are located in a rear portion 200R of the bed 200 to pivot the second hoop 320 to the rear portion 200R of the vehicle 10 such that the second hoop 320 can function as a support to the items with certain dimension at the open position. The dimension of the second hoop 320, and the location of the first and second pivot brackets 400, 500 may further be configured to have a certain height at the closed position to provide stylish look. In the depicted embodiment, the second hoop 320 has substantially the same height as the height of the first hoop 310 or substantially the same height as the top of the cabin 100 at the closed position. Alternatively, the top 322 of the second hoop 320 may be configured to be higher than the top 316 of the first hoop 310 at the closed position. It will be appreciated that the first pivot bracket 400 and the second pivot bracket 500 may be positioned at any appropriate locations in the sports bar assembly 300. For instance, the first and second pivot brackets 400 and 500 may be located adjacent to side walls 204, 206, respectively and adjacent a middle position of the bed 200 at the longitudinal direction L. Although it is not shown, the second hoop 320 may be pivoted to a stowed or closed position that is parallel to the first and second horizontal members 332, 342 at any open position such as being perpendicular to the first and second horizontal members 332, 342.

Figure 3A:
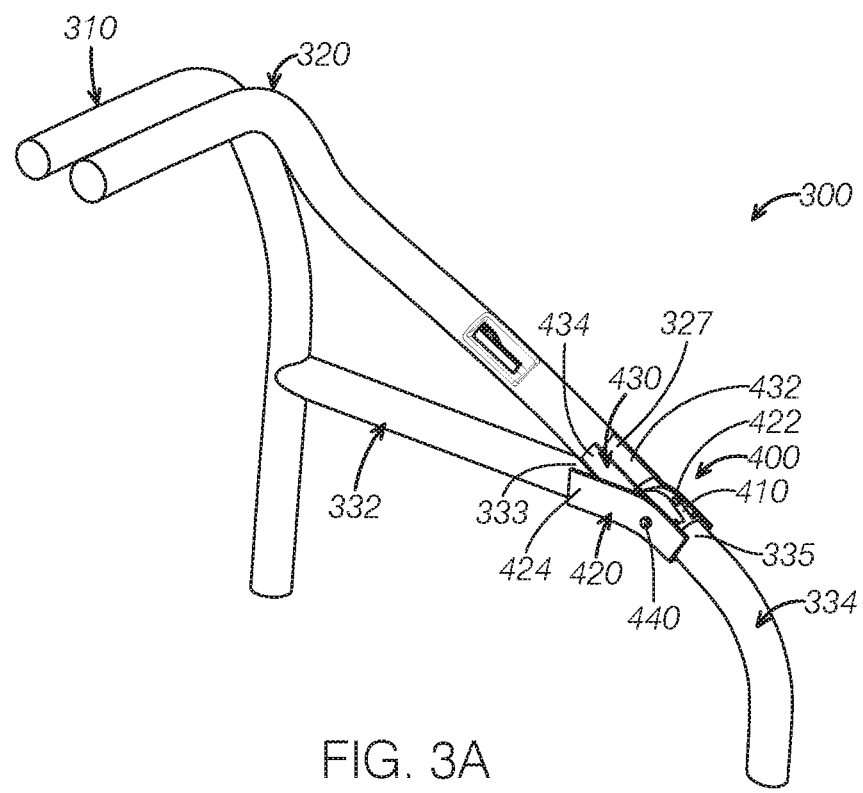
FIG. 3A and FIG. 3B are partial views of the sports bar assembly in FIGS. 1A and 1B, illustrating a connection structure.
Figure 3B:
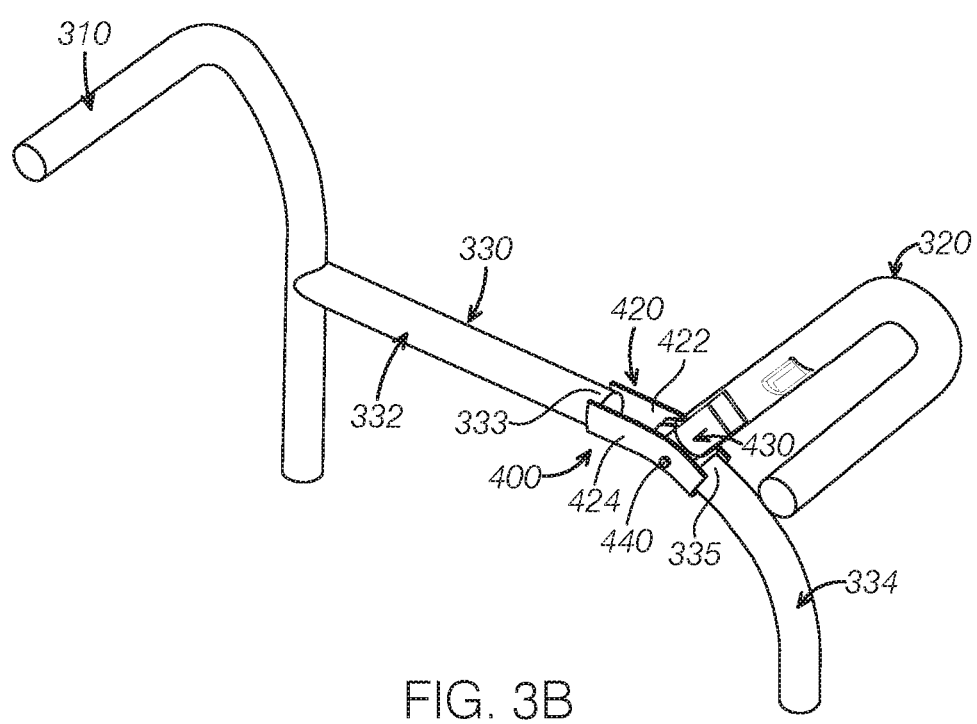

FIG. 3A and FIG. 3B show a partial view of the sports bar assembly 300, illustrating the pivot connection of the second hoop 320 with the first member 332 via the first pivot bracket 400. It will be understood that the second pivot bracket 500 may have the same or similar structure. As is shown through FIG. 2 to FIG. 3B, the first end 327 of the second hoop 320 is pivotably coupled to the first member 332 and second member 334 via the first pivot bracket 400. The first pivot bracket 400 has a body 410, a main brace 420 and a side brace 430. In the depicted embodiment, the body 410 is connected to the second member 334. It will be appreciated that the body 410 may alternatively be connected to the first member 332 or connected to both the first member 332 and the second member 334. The main brace 420 is connected to the first member 332 and the second member 334. In some embodiments, the main brace 420 and the side brace 430 are connected to the body 410 via a pivot 440. In the depicted example, the main brace 420 includes a first plate 422 and a second plate 424 opposing the first plate 422, and the first plate 422 and the second plate 424 sandwich a first end 333 of the first member 332 and a second end 335 of the second member 334 to join the first member 332 and the second member 334 together. The first end 333 and the second end 335 may be connected to the main brace 420 by any appropriate approaches such as welding or fasteners (screw/nut/rivet). In the depicted embodiment, the first plate 422 and the second plate 424 are separated parts. Alternatively, the main brace 420 may include a bottom plate positioned under the first base (not shown) and connected to the first plate 422 and the second plate 424 to have a U shape cross section. The main brace 420 may be integrally formed.

Continuing with FIG. 3A and FIG. 3B, the side brace 430 is connected to the second hoop 320 and pivotable to the body 410 and thus the second hoop 320 can be rotated relative to the first base 330. In one embodiment, the side brace 430 may include a third plate 432 and a fourth plate 434 opposing the third plate 432, and the third plate 432 and the fourth plate 434 sandwich the end 327 of the second hoop 320 so as to pivotally couple the second hoop 320 to the body 410 of the pivot bracket 400 via the pivot 440. The side brace 430 may be connected to the end 327 of the second hoop 320 by any appropriate approaches such as welding, or fasteners (screw/nut/rivet). In other examples, the third plate 432 and the fourth plate 434 may be an integral portion of the second hoop that naturally extends out. That is, at least one end portion of the second hoop 320 is a hollow tube and two portions of the end of the second hoop 320 may be carved out to form the third and fourth plates 432, 434.

Figure 4:
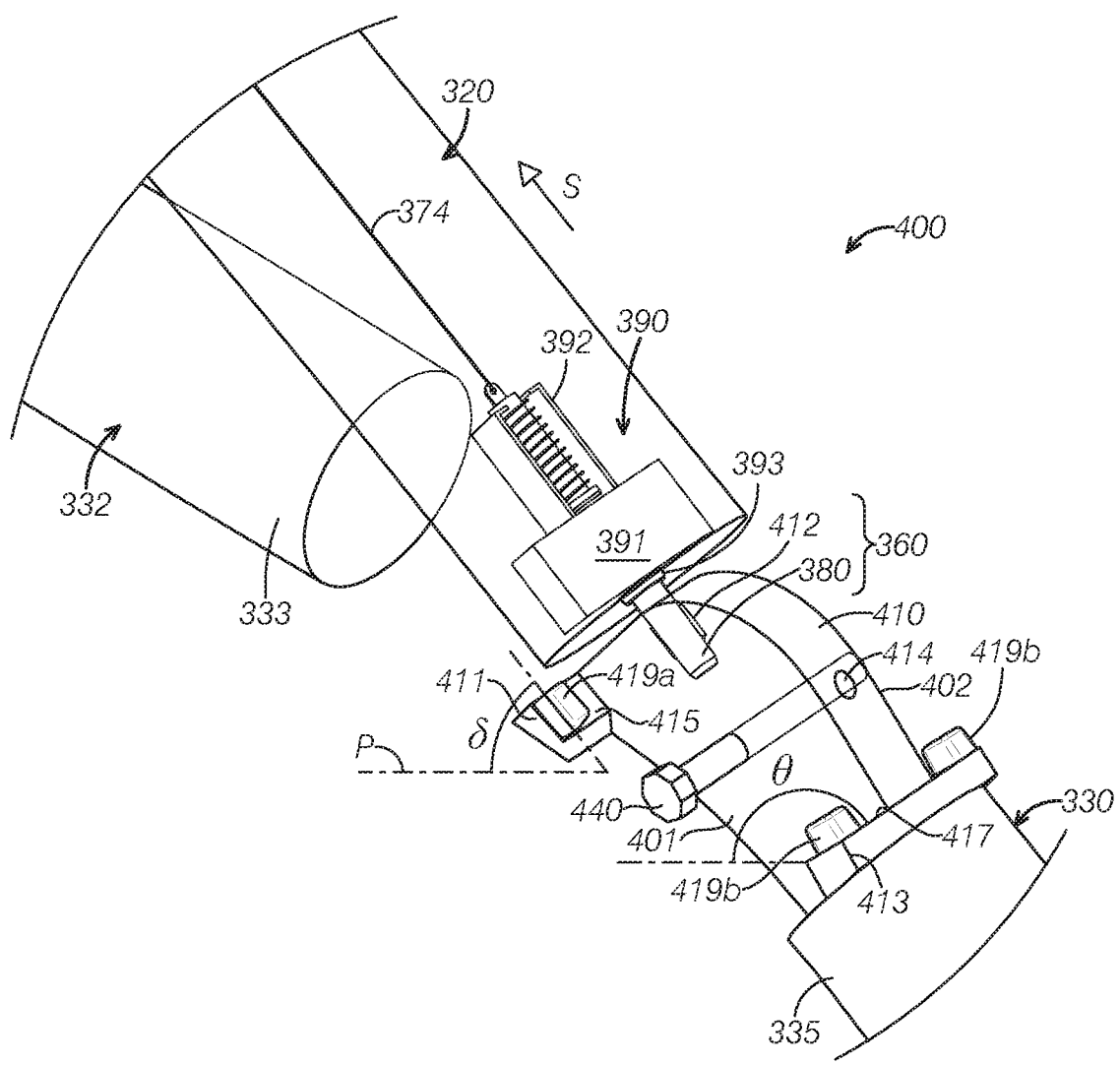
FIG. 4 illustratively depicts a pivot bracket of a sports bar assembly according to one embodiment of the present disclosure.
Figure 6:
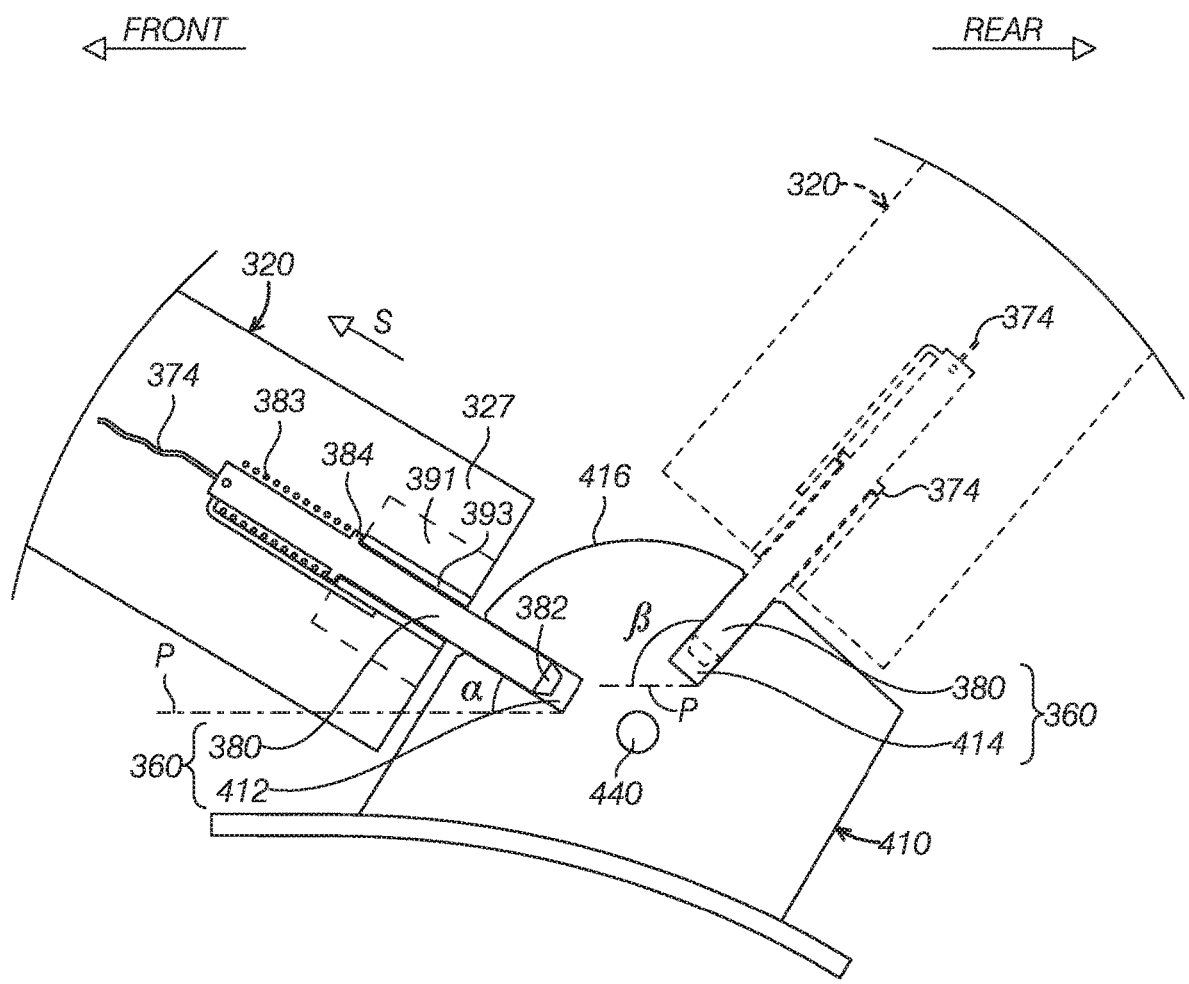
FIG. 6 is a sectional view of an end of the second hoop and the pivot bracket in FIG. 4, illustrating a locked position of the second hoop on the pivot bracket at the open position and closed position.

The second hoop 320 may be locked and released from the pivot bracket 420 and the example embodiments are illustrated in FIG. 4 through FIG. 6. FIG. 4 illustrates an example of a lock device 360, FIG. 5A and FIG. 5B illustrates a release device 370, and FIG. 6 shows a section of the lock device 360 at both the open position (dashed lines) and the closed position. In one embodiment, the sports bar assembly 300 further includes the lock device 360 to lock the second hoop 320 to the first base 330 at the open and closed positions, and the release device 370 located on the second hoop 320 to unlock the second hoop 320. The release device 370 is configured to unlock the second hoop 320 such that the second hoop 320 is pivotable between the open position and the closed position. Referring to FIG. 4 and FIG. 6, the lock device 360 may include a pin and a plurality of receiving apertures that define a plurality of lock positions. For instance, the body 410 of the pivot bracket 400 includes a first aperture 412 and a second aperture 414 configured to receive the pin 380 located on the second hoop 320. The first aperture 412 has a first angle α to a plane P substantially parallel to the bed 200, or to the bottom panel 210 of the bed 200, and the first aperture 412 opens or faces toward a front of the truck 10. The second aperture 414 has a second angle 3 to the plane P and opens or faces toward a rear of truck 10. The first angle α may be less than 90 degrees and the second angle 3 may be greater than the 90 degrees. The pin 380 may be positioned at an end portion of the second hoop 320. The second hoop 320 is locked at the closed position when the pin 380 is received in the first aperture 412 and the second hoop 320 is locked at the open position when the pin 380 is received in the second aperture 414.

Referring to FIG. 4 and FIG. 6, the body 410 of the pivot bracket 400 includes a curved surface 416 between the first aperture 412 and the second aperture 414 to facilitate the pivotal movement of the second hoop 320. During the pivotal movement of the second hoop 320, the end 327 or the pin 380 can slide on the curved surface 416, or move along a path of the curved surface 416 without directly contacting the curved surface 416. In some embodiments, one of the pin 380 and the curved surface 416 may include a soft layer such as rubber or fabric layer to reduce unwanted noise in case that the pin 380 contacts the curved surface 416. While the curved surface 416 is depicted as an arc, it will be appreciated that the body 410 may have other surface configurations such as a curved groove recessed from an upper surface of the body 410. Further, it will be appreciated that the body 410 may include more than two apertures such that the second hoop 320 can stay at multiple positions.

Referring to FIG. 4, in some embodiments, the body 410 may further include two top protrusions 411 and two lower protrusions 413 to restrict the movements of the side brace 304 or the second hoop 320. It will be appreciated that the number of protrusions may vary. The two top protrusions 411 extend from side surfaces 401, 402 of the body 410 and form a first stop surface 415 having a third angle δ to the plane P. With further reference to FIG. 6, the third angle δ may be the same as the first angle α. A bumper 419a is formed on the first stop surface 415 of each of the top protrusions 411 and is spaced away from the side surface 401, 402 of the body 410. The two lower protrusions 413 extend from the side surfaces 401, 402 and form a second stop surface 417 having a fourth angle θ to the plane P. With further reference to FIG. 6, the fourth angle θ may be the same as the second angle β. A bumper 419b is formed on the second stop surface 417 of each of the lower protrusions 413 and is spaced away from the side surface 401, 402 of the body 410. The side brace 430 may be rested on the first stop surface 415 at the closed position such that further front downward movement of the second hoop 320 is stopped. The side brace 430 may be partially rested on the second stop surface 417 at the open position such that further rear downward movement of the second hoop 320 is stopped. The upper bumpers 419a on the first stop surface 415 and the lower bumpers 419b on the second stop surface 417 further restrict lateral movement of the second hoop 320 at the closed position and the open position, respectively.

Referring to FIGS. 5A and 5B and with further reference to FIG. 4, the release device 370 includes a release handle 372 and a cable 374 extending in the second hoop 320. The cable 374 connects the pin 380 to the release handle 372. A force applied on the release handle 372 can cause the pin 380 to be released from the first aperture 412 and the second aperture 414. In one embodiment, the release handle 372 is located at an outer surface of the second hoop 320 and facing an inner portion of the bed 200 such that it is easy for a user to grab the release handle 372 and apply a force. With further reference to FIG. 4 and FIG. 6, the second hoop 320 may be at least partially hollow and includes a pin housing 390 at the end 327. The pin housing 390 includes a plug 391 generally facing outward and an inner chamber 392 extending inwardly in the second hoop 320 to accommodate the pin 380. The plug 391 includes a hole 393 for the pin 380 to pass through. In the depicted embodiment, the pin 380 further includes at least one flange 384 extending at a radial direction, which defines a length of a portion of the pin 380 protruding out of the hole 393. In other words, the flange 384 has a dimension larger than a diameter of the hole 393 and the flange 384 can not move further in the hole 393 once the flange 384 rests on an end of the hole 393. A proximal end of the pin 380 passes through a spring 383 and is connected to the cable 374. The spring 383 is disposed in the chamber 392 and an end of the spring 383 rests against an end wall of the chamber 392 and another end of the spring 383 sits on the flange 384. The pin 380 is biased toward a tip portion 382 by the spring 383 and a portion of the pin 380 extends out of the hole 393 at the locked position. When a force is applied on the release handle 372, the cable 374 is pulled to cause the pin 380 to move inwardly along the direction S, and compress the spring 383 meanwhile the outer portion of the pin 380 is retracted into the hole 393 of the pin housing 390 and thus the second hoop 320 is unlocked from the pivot bracket 410. The second hoop 320 remains unlocked until the force is removed from the release handle 370. After the user releases the handle, the pin 380 is pushed along a direction S' opposite the direction S under the force of the compressed spring 383, until the flange 384 rests on the walls of the hole 393 and the second hoop 320 is locked. In some embodiments, the pin 380 may be sized to have clearance fit or transition fit with the apertures 412, 414 to keep desired engagement. In some embodiments, the tip portion 382 of the pin 380 may have a truncated cone shape to facilitate the insertion of the pin 380 into the first aperture 412 and the second aperture 414.

Similarly, the second end 329 of the second hoop 320 includes a second pin 381 and the second end 329 is coupled to a second pivot bracket 500. The second pivot bracket 500 includes a body, a third aperture and a fourth aperture on the body to receive the second pin at an open position and a locked position. In some embodiments, a release handle 372 located on one side of the second hoop 320 may release both the first pin 380 and the second pin 381. For example, the cable 374 may extend along a portion or along the inner chamber of the second hoop 320 to connect the release handle 372 to the first pin 380 and the second pin. A force applied on the release handle 372 pulls the first pin 380 out from the first aperture 412 or the second aperture 414 of the first body 410, as well as pulls the second pin 381 out from the third aperture or the fourth aperture.

Referring to FIG. 5A and FIG. 5B, in some embodiments, the release device 370 further includes an actuator 376 located between the release handle 372 and the second hoop 320. The handle 372 is disposed on a recess 323 formed on the outer surface while the actuator 376 is disposed inside the chamber of the second hoop 320. The actuator 376 shares the same axis with the release handle 372 and pivots as the release handle 372 pivots. The actuator 376 includes a first arm 377 and a second arm 378 forming an angle to the first arm 377. The first arm 377 is coupled to the first pin 380 via a first cable segment 375, and the second arm 378 is coupled to the second pin 381 via a second cable segment 379. A force applied on the release handle 372 causes both the first arm 377 and the second arm 378 pivot simultaneously along the direction N and pull the first pin 380 out from the first aperture 412 or the second aperture 414 on the first body 410 of the first pivot bracket 400, and pull the second pin 381 out from the third aperture or the fourth aperture on the second body 510 of the second pivot bracket 500 and complete unlock at one step.

During an unlock operation, a user may continue to grab the release handle 372 and pivot the second hoop 320 until the second hoop 372 reaches an open or closed position, or until the second hoop 320 or the side brace reaches the above mentioned the first and/or the second stop surfaces of the first and pivot brackets 400, 500. When the first and second pins 380, 381 are moved to the corresponding apertures, the user may free the release handle 370 such that the pin is inserted into corresponding apertures to complete the lock process. Alternatively, the user may free the release handle 370 after unlocking and rotating the second hoop 320. That is, the pins 380, 381 are kept contacting the body of the pivot bracket and are slid until the pins 380, 381 inserted into the corresponding apertures to complete lock process again.

Figure 7:
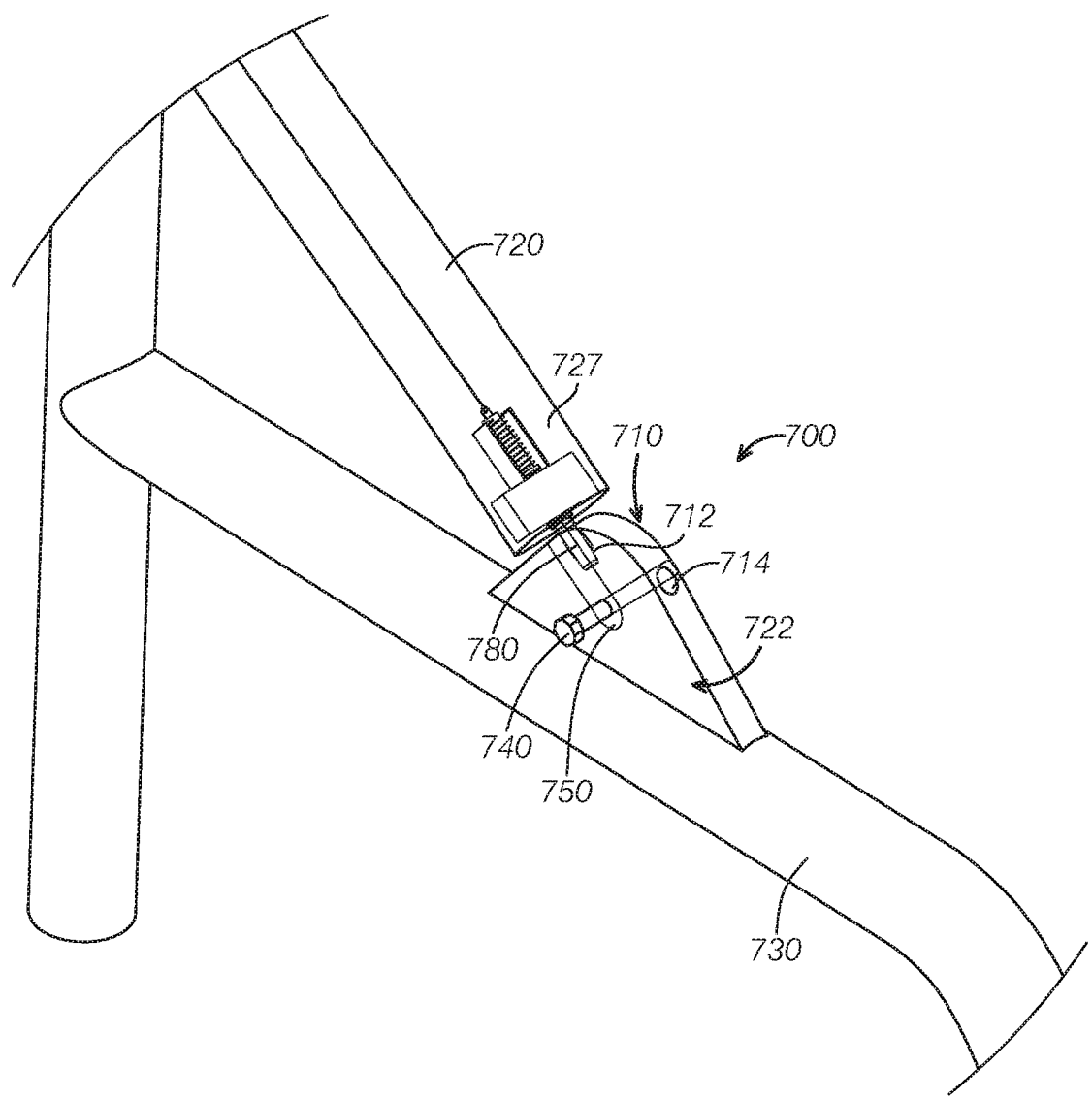
FIG. 7 illustratively depicts a sports bar assembly according to another embodiment of the present disclosure.

FIG. 7 illustrates another embodiment of a sports bar assembly 700. For the sake of brevity, the differences with the embodiments in FIGS. 2-6 are described in detail. The sports bar assembly 700 includes a first base 730, a second hoop 720 and a pivot bracket 710 to connect the first base 730 and the second hoop 720. The base 730 is formed as one integrated piece. The pivot bracket 710 is connected to the base 730 via any suitable measures such as welding, and fastener connection. The pivot bracket 710 includes a body 722, a pivot 740 and a side brace 750 pivotably connected to the body 722 via the pivot 740. The body 722 includes a first aperture 712 and a second aperture 714 to receive the pin 780 disposed on an end 727 of the second hoop 720. The side brace 750 may be connected to the end 727 of the second hoop 320 with any appropriate approaches. The side brace 750 may be configured as a housing to cover the body 722 and isolate the pivot bracket 710 from an outside environment and/or to provide better appearance. Alternatively, the side brace 750 may be natural extension of the second hoop 720.

The sports bar assembly of the present disclosure may include a base connected to the floor or the bottom panel of the bed and a hoop connected to the base and pivotable between an open position and a closed position. At the closed position, the hoop provides a sporty or a personalized touch on the truck. At the open position the hoop can function as a support to hold various items such as oversized items.

Those who skilled in the art will readily recognize from such discussion, and from the accompanying drawings and claims that various changes, modifications and variations can be made therein without departing from the true spirit and fair scope of the invention as defined by the following claims.

The following claims particularly point out certain combinations and subcombinations regarded as novel and nonobvious. These claims may refer to "an" element or "a first" element or the equivalent thereof. Such claims should be understood to include incorporation of one or more such elements, neither requiring nor excluding two or more such elements. Other combinations and subcombinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

What is claimed is:

1. A sports bar assembly in a truck, comprising:
a base including a first member and a second member coupled to the first member via a pivot bracket; and
a hoop pivotally connected to the pivot bracket to be rotatable between an open position and a closed position;
wherein a top of the hoop is adjacent to a cabin of the truck at the closed position and the top of the hoop is at a rear of a truck bed at the open position;
wherein the pivot bracket includes a body connected to one of the first member and the second member, a main brace connected to the first member and the second member, and a side brace connected to the hoop and pivotal relative to the body; and
wherein the main brace and the side brace are connected to the body via a pivot.

2. The sports bar assembly of claim 1, further comprising a locking device to lock the hoop to the base at the open position and at the closed position, and a release device disposed on the hoop to unlock the hoop such that the hoop is pivotable between the open position and the closed position.

3. The sports bar assembly of claim 1, wherein the main brace includes a first plate and a second plate opposing the first plate, wherein the first plate and the second plate sandwich an end of the first member and an end of the second member, and the side brace includes a third plate and a fourth plate opposing the third plate, and wherein the third plate and the fourth plate sandwich an end of the hoop and couple the hoop to the body of the pivot bracket.

4. The sports bar assembly of claim 1, wherein the body of the pivot bracket includes a first aperture having a first angle to the truck bed and facing a front of the truck, and a second aperture having a second angle to the truck bed and facing the rear of the truck, and an end of the hoop further includes a pin, and wherein the hoop is locked at the closed position when the pin is received in the first aperture and the hoop is locked at the open position when the pin is received in the second aperture.

5. The sports bar assembly of claim 4, wherein a tip portion of the pin has a truncated cone shape to facilitate movement of the pin into and out of the first aperture and the second aperture.

6. The sports bar assembly of claim 4, wherein the hoop further comprises a release device, and the release device includes a release handle and a cable extending in the hoop to connect the pin with the release handle, and wherein a force on the release handle enables the pin to be released from the first and second apertures.

7. The sports bar assembly of claim 6, wherein the body of the pivot bracket includes a curved surface between the first aperture and the second aperture to facilitate a movement of the hoop, two top protrusions and two lower protrusions, wherein the two top protrusions form a first stop surface having a third angle to the truck bed and the two lower protrusions form a second stop surface having a fourth angle to the truck bed, and wherein at least one of the hoop and the side brace is partially rested on the first and second stop surfaces at the open position and the closed position, respectively.

8. The sports bar assembly of claim 7, wherein the body of the pivot bracket includes two top bumpers on the first stop surface and two lower bumpers on the second stop surface to restrict lateral movement of the hoop or the side brace at the closed position and the open position, respectively.

9. The sports bar assembly of claim 7, wherein the hoop is at least partially hollow and includes a pin housing at the end, and the pin is extendable through a hole of the pin housing by a force on the release handle.

10. The sports bar assembly of claim 1, wherein the hoop has a U-shape and comprises a first end and a second end, wherein the base comprises a first base and a second base, wherein the pivot bracket includes a first pivot bracket and a second pivot bracket, and wherein the first end and the second end of the hoop are connected to the first and second base, respectively via the first and second pivot bracket.

11. A sports bar assembly for a truck having a cabin and a truck bed, comprising:
a first base connected to the truck bed,
a second base connected to the truck bed and spaced apart from the first base at a transverse direction,
a first hoop connected to the first base and the second base, wherein the first hoop is adjacent to the cabin,
a second hoop, wherein the second hoop has a U-shape, a first end of the second hoop is pivotably connected to the first base via a first pivot bracket, and a second end of the second hoop is pivotably connected to the second base via a second pivot bracket such that the second hoop is rotatable between an open position and a closed position, and wherein the second hoop is away from the first hoop at the open position; and the second hoop is close to the first hoop at the closed position; and
a locking device to lock the second hoop at the open position and the closed position and a release device disposed on the second hoop to unlock the second hoop from the open position and the closed position;
wherein the first end of the second hoop includes a first pin and the second end of the second hoop includes a second pin, and the release device includes a release handle and a cable extending along a portion of the second hoop and connecting the release handle to the first and second pins, and wherein a force on the release handle causes both the first pin to be released from a first aperture or a second aperture in a first body of the first pivot bracket and the second pin to be released from a third aperture or a fourth aperture in a second body of the second pivot bracket, respectively.

12. The sports bar assembly of claim 11, wherein the first pivot bracket further includes a first side brace, and the second pivot bracket further includes a second side brace, and wherein the first end and second end of the second hoop are connected to the first side brace and the second side brace, respectively and rotatable to the first body and the second body, respectively.

13. The sports bar assembly of claim 12, wherein the first base includes a first member and a second member, and the second base includes a third member and a fourth member, wherein the first pivot bracket includes a first main brace, and the second pivot bracket includes a second main brace, wherein the first and second members of the first base are connected by the first main brace and the third and fourth members are connected by the second main brace.

14. The sports bar assembly of claim 11, wherein the release handle is located at an outside surface of the second hoop and faces an inner portion of the truck bed.

15. The sports bar assembly of claim 11, wherein the release device further includes an actuator, wherein the actuator is disposed between the release handle and the second hoop, and has a first arm and a second arm forming an angle with the first arm, wherein the first arm is connected to the first pin via a first cable segment and the second arm is connected to the second pin via a second cable segment, wherein a force on the release handle enables the first and second arms to pivot simultaneously and pulls the first pin out from the first aperture or the second aperture in the first body of the first pivot bracket and the second pin out from the third aperture or the fourth aperture in the second body of the second pivot bracket.

16. A sports bar assembly in a truck, comprising:
a first base extending at a longitudinal direction and connected to a truck bed, wherein the first base includes a first horizontal member and a first base member coupled to the first horizontal member by a first pivot bracket;
a second base extending at the longitudinal direction and connected to the truck bed, wherein the second base is spaced away from the first base at a transverse direction, and wherein the second base includes a second horizontal member and a second base member coupled to the first horizontal member by a second pivot bracket; and a hoop, wherein the hoop includes a cross beam, a first pillar and a second pillar, wherein the first pillar is pivotable relative to the first base via the first pivot bracket and the second pillar is pivotable relative to the second base via the second pivot bracket between an open position and a closed position;

wherein the cross beam of the hoop is adjacent to a top of a cabin of the truck at the closed position and is away from the top of the cabin at the open position;

wherein the first pivot bracket includes a first body connected to one of the first horizontal member and the first base member, a first main brace connected to the first horizontal member and the first base member, and a first side brace connected to the first pillar and pivotal relative to the first body, and the first main brace and the first side brace are connected to the first body via a first pivot; and wherein the second pivot bracket includes a second body connected to one of the second horizontal member and the second base member, a second main brace connected to the second horizontal member and the second base member, and a second side brace connected to the second pillar and pivotal relative to the second body, and the second main brace and the second side brace are connected to the second body via a second pivot.

\* \* \* \* \*